United States Patent

Bissonnette et al.

[11] Patent Number: 6,142,262
[45] Date of Patent: Nov. 7, 2000

[54] WET DISC PACK WITH MODIFIED STATIONARY DISCS

[75] Inventors: Lee A. Bissonnette; Glenn W. Herron, both of Clarkston, Mich.

[73] Assignee: Meritor Heavy Vehicle Systems, LLC, Troy, Mich.

[21] Appl. No.: 09/176,446

[22] Filed: Oct. 21, 1998

[51] Int. Cl.$^7$ ...................................................... F16D 55/02
[52] U.S. Cl. .............. 188/71.5; 188/218 A; 188/218 XL
[58] Field of Search ................... 188/71.5, 71.6, 188/218 A, 218 XL

[56] References Cited

U.S. PATENT DOCUMENTS

| | | | |
|---|---|---|---|
| 3,378,115 | 4/1968 | Stephens | 188/218 A |
| 3,575,270 | 4/1971 | Wagenfuhrer | 188/218 A |
| 4,286,694 | 9/1981 | Wiseman, Jr. et al. | 188/71.5 |
| 4,825,983 | 5/1989 | Nakanishi | 188/218 A |
| 5,134,005 | 7/1992 | Wada et al. | 428/65 |
| 5,224,572 | 7/1993 | Smolen, Jr. et al. | 188/218 XL |
| 5,417,313 | 5/1995 | Matsuzaki et al. | 188/218 XL |
| 5,613,578 | 3/1997 | Moseley et al. | 188/218 XL |
| 5,701,976 | 12/1997 | Kumagai et al. | 188/71.5 |

FOREIGN PATENT DOCUMENTS 2537038  3/1977  Germany ................ 188/315

Primary Examiner—Chris Schwartz
Attorney, Agent, or Firm—Carlson, Gaskey & Olds

[57] ABSTRACT

A stationary disc for use in a wet disc brake assembly includes a plurality of holes drilled through the disc. The holes change the mass of the disc, and thus change the frequency of the entire disc brake assembly. This portion of the invention is particularly useful to modify the frequency such that it is not approximately equal to the frequency of an associated stationary member. In addition, the holes may be plugged with a material that becomes viscous at expected operational temperatures of the brake. This is valuable to provide a vibration dampener, that inherently becomes actuated when the brake heats.

13 Claims, 1 Drawing Sheet

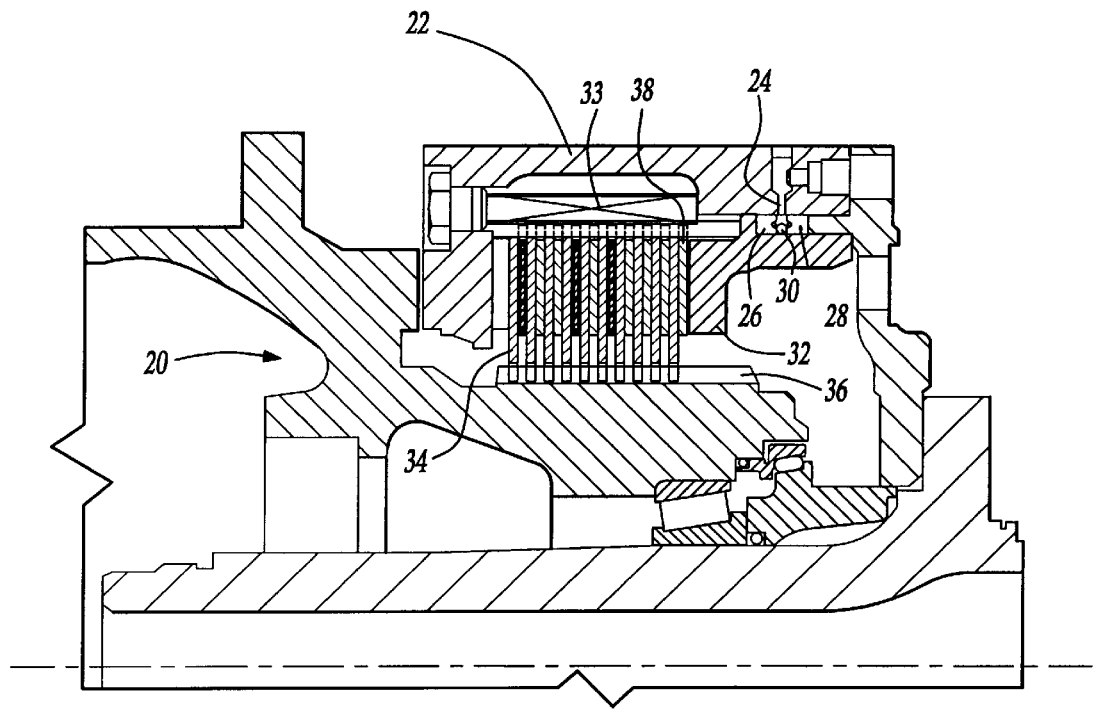
*Fig-1*
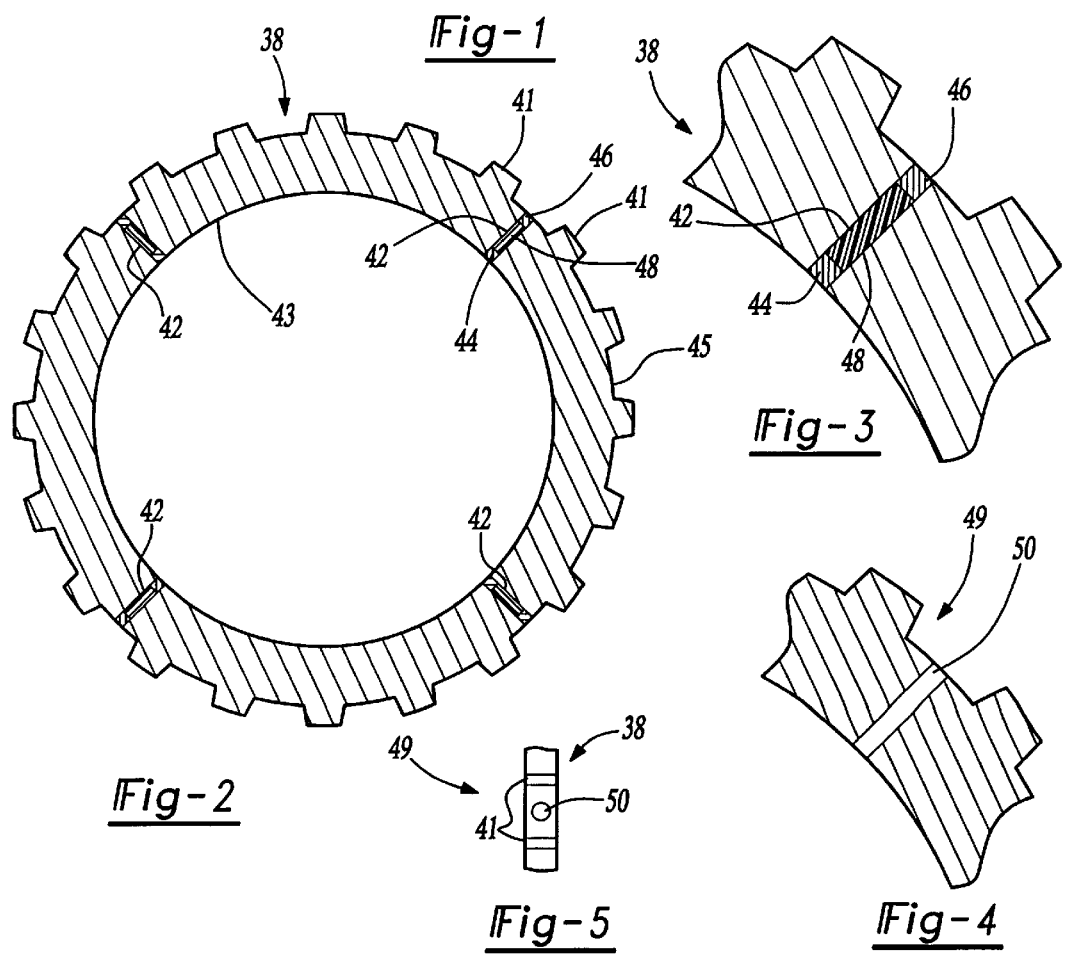
*Fig-2*
*Fig-3*
*Fig-5*
*Fig-4*

WET DISC PACK WITH MODIFIED STATIONARY DISCS

BACKGROUND OF THE INVENTION

This invention relates to modifications to friction discs utilized in wet disc brakes to address noise, heat transfer and vibration issues.

Wet disc friction brakes are utilized to stop many vehicles. This type of brake is also used in many other non-vehicle applications. Generally, a wet disc friction brake includes a plurality of rotating discs fixed to an inner rotating member which rotates with the wheel, and a plurality of interspaced discs fixed to a stationary housing member. Typically, the rotating discs are provided with friction material. The piston is normally biased out of contact with the rotating and stationary discs by a spring bias force. A hydraulic chamber is selectively supplied with a pressurized fluid to bias a piston against the spring force and to collapse the rotating and stationary discs together. As the discs collapse together, they engage each other and the friction created between the discs reduces rotation of the rotating member relative to the stationary member.

One challenge with regard to the design of the discs in the wet friction brake environment, occurs when the frequency of the disc brake assemblies approximates the frequencies of the axles which carry the disc brake assemblies. When such a combination occurs, during deceleration, both the axle and the disc brake assembly have sometimes both reached their resonant frequency. At that time, a vehicle may experience vibrating and/or noise.

Other issues with regard to the design of wet disc friction brakes relate to a slip phenomena which occurs as the brake absorbs energy. Generally, the wet disc friction brakes are called "wet" since there is a lubricant supplied to the chambers around the discs. When the vehicle is cold, the lubricant can be viscous, and there may be little slippage between the discs when the brakes are engaged. However, as the vehicle heats, the oil becomes less viscous and there can occur a "slip and stick" phenomena wherein the brakes will first engage, then stick relative to each other, then re-engages. There can be undesirable vibration and heat transmitted to the discs when this occurs.

SUMMARY OF THE INVENTION

In a disclosed embodiment of this invention, at least one, and preferably several, of the stationary discs in a wet disc brake are supplied with spaces to change the mass of the discs. Preferably, this change in mass occurs without change in the frictional surface contact area. In this way, the frequency of the brake assembly can be changed such that it does not occur in the same approximate frequency range as the frequency of the axle assembly. The same would be true if the frequency of the system being braked in a non-vehicle application was the same as the brake frequency. Thus, the problem discussed above of the axle and brake having an approximately equal frequency, and the resultant undesirable noise and/or vibration is eliminated.

In another feature of this invention, the spaces are provided by forming apertures through the disc between an inner peripheral surface to an outer peripheral surface. Generally, holes are drilled through the disc members. This mass change thus does not change the frictional surface area.

In a further feature, the holes are filled with a material that will become viscous, or gelatinous upon heating to temperatures above ambient, and on the order of 100° F., as an example. The material thus becomes a vibration dampener and/or heat exchanger within the hole. Most preferably, the material will become viscous in a temperature range expected by the heated brake (i.e. on the order of 100° F.) and is solid at ambient temperatures such that it can be inserted into the drilled holes. Sealed plugs preferably enclose the material within the holes and seal each end.

When the brake becomes heated, the material can become viscous. When the "slip and stick" phenomena occurs, the viscous material will serve as a vibration dampener lessening the undesirable effects of the "slip and stick" actuation. The material may not eliminate the "slip and stick" phenomena, but will reduce vibration and noise that have accompanied the phenomena in the past. The holes and the material also provide improved heat transfer away from the friction surface.

Further, by removing the mass of the disc, the brake designer can insure that the brake assembly has a frequency that is not in the same approximate frequency as that of the axle assembly or other system. Again, this will result in a change in vibrating characteristics affecting the operation of the brake assembly.

These and other features of the present invention can be best understood from the following specification and drawings, the following of which is a brief description.

BRIEF DESCRIPTION OF THE DRAWINGS

FIG. 1 is a cross sectional view of the wet disc friction brake.

FIG. 2 is a cross sectional view through a stationary disc.

FIG. 3 is an enlarged view of a portion of the disc shown in FIG. 2.

FIG. 4 shows a second embodiment disc.

FIG. 5 is an end view of the FIG. 4 disc.

DETAILED DESCRIPTION OF A PREFERRED EMBODIMENT

A wet disc brake assembly 20 is illustrated in FIG. 1. A stationary outer housing 22 is provided with a fluid passage 24 extending to a chamber between two seals 26 and 28. The chamber 30 receives hydraulic fluid from the passage 24, and moves a piston 32 to the left as shown in FIG. 1 when pressurized fluid is injected into the chamber 30. A spring 33 (shown schematically) biases the piston 32 against the hydraulic force, and to the right as shown in FIG. 1. The hydraulic force overcomes the force of the spring 33, and collapses a plurality of inner fraction discs 34, which are received on a rotating wheel hub 36, against a plurality of stationary outer discs 38. As known, discs 34 have inner teeth interspaced with splines on the shaft 36. The outer discs 38 have a plurality of outer teeth which are interspaced with mating teeth on the housing 32. The brake is illustrated in a vehicle but such brakes have non-vehicle applications.

The area where the discs 34 and 38 are received is immersed in oil. The present invention is directed to an improvement that is particularly valuable when applied to stationary discs 38. However, the invention may have some benefit and application with regard to the rotating discs 34. As shown in FIG. 2, the stationary discs 32 of the present invention are provided with holes 42 extending from an inner periphery 43 to the outer periphery 45. Preferably, holes 42 are formed between teeth 41. An inner plug 44 and an outer plug 46 enclose the holes 42. The material 48 that will become viscous at temperatures above ambient, as an example, on the order of 100° F., fills the holes 42 between the end plugs 44 and 46. The material is preferably selected such that it becomes not liquid, but paste-like or gelatinous, and capable of movement at temperature ranges which are expected in the brake assembly 20 after a short period of use. As an example, nylon 66 may be suitable for the application. Other plastics may also be used.

By removing the material with holes 42 from the metal disc 38, the mass of the discs is significantly changed. As shown, there are four of the holes 42 spaced at approximately 90° angles about a central axis of the disc 38. By removing this amount of mass from several of the discs 38, the overall frequency of the brake assembly may be changed. This will be desirable if the frequency of the brake assembly 20 would otherwise be in the approximate range as the frequency of the axle assembly which is to receive the brake assembly 20. By modifying the mass, the frequency is modified, and the chance of the brake assembly and the axle assembly having approximately equal frequencies is reduced. The holes 42 also provide heat transfer benefits.

In addition, the use of material 48, which can be best seen in FIG. 3 as extending between the plugs 44 and 46, provides vibration dampening benefits. As explained above, after a short period of use, the disc may sometimes be exposed to a phenomena called "slip and stick" wherein the discs may slip and then stick relative to each other. This can result in undesirable vibration, heat and noise at discs 38. The viscous material from the plug 48, which melts upon the application of heat, as occurs after a short operation of the brake assembly 20, provides a vibration dampener and heat transfer effect which will help reduce undesirable vibration and noise from the slip and stick phenomena.

By viscous or gelatinous as used in this application, applicant means to describe a material then preferably does not become liquid and freely flowable. Rather, the material will preferably have a paste-like consistency such that it will be a good vibration dampener.

It may be that the material could be formed of a material that becomes solid at operational temperatures, if that material could then have beneficial vibration characteristics.

FIG. 4 shows another embodiment 49, wherein the passages 50 are simply left open. This embodiment can also provide vibration dampening effect, and provide the modification of the mass for the changing frequency and the heat transfer benefits as described above.

FIG. 5 is an end view of the embodiment 49 and shows the opening 50 between two teeth 41. It should be understood that this view would also be similar if it were of the FIG. 3 embodiment.

Preferred embodiments of this invention have been disclosed; however, a worker of ordinary skill in the art would recognize that certain modifications come within the scope of this invention. For that reason, the following claims should be studied to determine the true scope and content of this invention.

What is claimed is:

1. A wet disc brake assembly comprising:

a plurality of rotating discs rotating with a rotating shaft;

a plurality of stationary discs fixed against rotation on a stationary member, said discs on both said shaft and said member being axially movable;

a piston for compressing said rotating and stationary discs to engage each other; and at least one of said discs being provided with spaces to reduce the mass of said disc, and thus the mass of said brake assembly, said discs extending between two side faces, and said spaces being formed within said disc, at a location between said side faces such that said spaces do not extend outwardly to said side faces.

2. A brake assembly as recited in claim 1, wherein at least one of said stationary discs is provided with said spaces.

3. A brake assembly as recited in claim 2, wherein a plurality of said stationary discs are provided with said spaces.

4. A brake assembly as recited in claim 2, wherein each of said spaces are provided by a hole extending from an inner peripheral bore to an outer peripheral surface of said stationary disc.

5. A brake assembly as recited in claim 4, wherein said holes are provided at equally spaced locations about a central axis of said disc.

6. A brake assembly as recited in claim 4, wherein said holes are provided with plugs at an inner peripheral surface and an outer peripheral surface, and a material is inserted between said plugs which becomes viscous at expected operational temperatures of said brake assembly.

7. A brake assembly as recited in claim 6, wherein said material which becomes viscous is a plastic material.

8. A brake assembly as recited in claim 7, wherein said plastic material is a nylon material.

9. A brake assembly as recited in claim 8, wherein said holes extend between teeth which are formed at an outer peripheral surface of said disc.

10. A brake assembly as recited in claim 1, wherein said assembly is used in a vehicle.

11. A stationary disc for use in a wet disc brake assembly comprising:

a disc body having an inner peripheral bore, and an outer peripheral surface, said outer peripheral surface being provided for engagement on a fixed member; and a plurality of holes extending through said body from said inner peripheral surface to said outer peripheral surface, said disc body extending between two side faces, and said holes extending through said body and between said side faces, and not extending outwardly to said side face.

12. A disc as recited in claim 11, wherein there are four of said holes spaced equal distance about a central axis of said disc.

13. A disc as recited in claim 11, wherein said holes are provided with plugs at said inner peripheral surface and said outer peripheral surface and material which becomes viscous at expected operational temperatures of a brake assembly is inserted in said holes between said plugs.

* * * * *